United States Patent [19]

Chiba

[11] Patent Number: 5,062,721
[45] Date of Patent: Nov. 5, 1991

[54] ROLLING BEARING WITH SLEEVE

[75] Inventor: Moichi Chiba, Yokosuka, Japan

[73] Assignee: Nippon Seiko Kabushiki Kaisha, Tokyo, Japan

[21] Appl. No.: 515,937

[22] Filed: Apr. 27, 1990

[30] Foreign Application Priority Data

| Apr. 28, 1989 | [JP] | Japan | 1-107343 |
| May 16, 1989 | [JP] | Japan | 1-55253[U] |
| May 16, 1989 | [JP] | Japan | 1-55254[U] |

[51] Int. Cl.$^5$ ............................................. F16C 27/00
[52] U.S. Cl. ................................. 384/536; 384/581; 384/585
[58] Field of Search ............... 384/493, 557, 905, 584, 384/585, 537, 535, 536, 581, 582; 403/372, 365, 28-30

[56] References Cited

U.S. PATENT DOCUMENTS

| 1,965,293 | 7/1934 | Ljungström | 384/535 |
| 2,650,866 | 9/1953 | Knudson | 384/537 |
| 3,053,591 | 9/1962 | Bensch et al. | 384/581 |
| 3,061,386 | 10/1962 | Dix . | |
| 3,447,846 | 6/1969 | Marsh | 384/536 |
| 3,554,619 | 1/1971 | Irwin | 384/536 |
| 3,586,402 | 6/1971 | Howe, Jr. | 384/536 |
| 3,709,570 | 1/1973 | Galbato | 384/536 |
| 4,229,055 | 10/1980 | Olschewski et al. | 384/536 |
| 4,790,683 | 12/1988 | Cramer, Jr. et al. | 403/365 X |
| 4,828,423 | 5/1989 | Cramer, Jr. et al. | 403/372 |

FOREIGN PATENT DOCUMENTS

| 11-2255 | 3/1936 | Japan . | |
| 14-21584 | 10/1939 | Japan . | |
| 15-13082 | 6/1940 | Japan . | |
| 44-22006 | 9/1969 | Japan . | |
| 56-131024 | 10/1981 | Japan . | |
| 57-53873 | 11/1982 | Japan . | |
| 62-62023 | 4/1987 | Japan . | |
| 1200005 | 12/1985 | U.S.S.R. | 384/535 |

Primary Examiner—Thomas R. Hannon
Attorney, Agent, or Firm—Helfgott & Karas

[57] ABSTRACT

A sleeve for supporting a rolling bearing comprising a metal core with a high degree of dimensional elasticity to produce a larger radial thickness in the free state, and a cylindrical synthetic resin spacer section laminated with the core, so that the sleeve can follow up the increase of the size of the space in which the sleeve is accommodated.

4 Claims, 8 Drawing Sheets

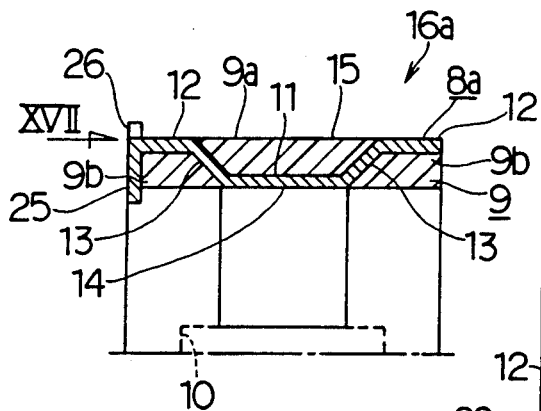
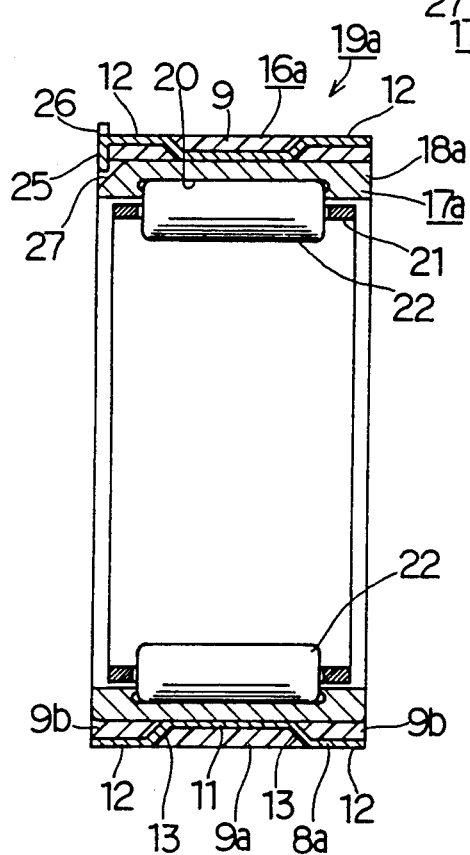
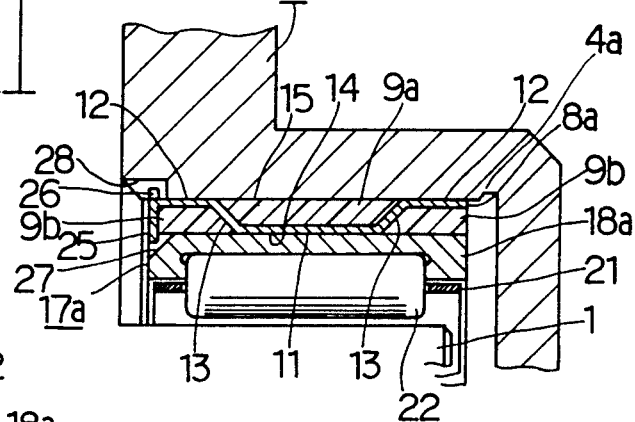
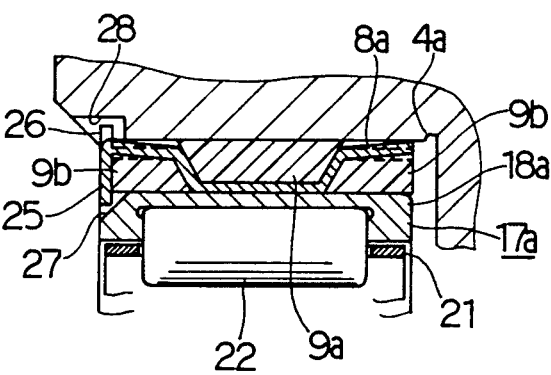
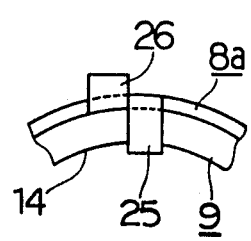

ROLLING BEARING WITH SLEEVE

BACKGROUND OF THE INVENTION

1. Field of the Invention

The present invention relates to a rolling-bearing/-sleeve assembly and, in particular, to a rolling bearing with a sleeve used, for example, to support the end of a rotary shaft for a rotor, which forms part of a compressor, in a freely rotatable manner in an aluminum compressor housing.

2. Description of the Prior Art

Conventionally, many types of compressors, such as the vane type or the like, for example, are used as compressors for air conditioners provided in automobiles.

In this kind of equipment having a rotary shaft rotating inside a housing as in the compressor used in an air conditioner and the like, the end section of the rotary shaft must be supported in a freely rotatable manner by the housing.

For this reason, a support section with a conventional configuration of the type shown in FIG. 1 is used, so that a rotary shaft 1 is supported at one end thereof in a freely rotatable manner by a wall surface 3 of a housing 2.

Specifically, the support section is comprised of a short cylindrical outer ring 5 fitted securely in a concave receiving section 4 formed in a cylindrical shape with a bottom in the wall surface of the housing 2 and having an inner raceway 7 on the inner peripheral surface of the outer ring 5, and a plurality of roller bodies 6, 6 provided between the inner raceway 7 on the inner peripheral surface of the outer ring 5 and the outer peripheral surface of the end section of the rotary shaft.

With the support section of the configuration outlined above, the rotary shaft 1 can be freely rotatable with a light force based on a rolling movement of the roller bodies 6, 6, so that the operation of a piece of equipment such as a compressor or the like proceeds smoothly.

The following drawbacks are inherent in a conventionally-used support section with this configuration.

In recent years, there have been many examples of equipment housings fabricated from aluminum alloys to provide lighter models of various types of equipment, such as compressors and the like. However, even when the housing is fabricated of aluminum alloy, the rotary shaft 1 as well as the outer ring 5 and the roller bodies 6, 6 which make up a rolling bearing must be made of steel because of the necessity for a high degree of rigidity and resistance to wear respectively in those parts.

A comparison of the coefficients of thermal expansion of steel and the aluminum alloy shows that the coefficient of thermal expansion of aluminum is considerably greater than the coefficient of thermal expansion of steel. For this reason, when the temperature of the equipment such as the compressor or the like rises, there is a large difference in the amount of thermal expansion in the housing 2 and that in the outer ring 5.

In the case where a large difference in thermal expansion occurs between the housing 2 and the outer ring 5 from a temperature rise, a clearance is produced between the inner peripheral surface of the concave receiving section 4 formed in the housing 2 and the outer peripheral surface of the outer ring 5.

When such a clearance is produced between the inner peripheral surface of the concave receiving section 4 and the outer peripheral surface of the outer ring 5, the outer ring 5 runs roughly against the inner surface of the concave receiving section 4. As a result, during rotation the rotary shaft 1 runs eccentrically with respect to the housing 2 to a degree corresponding to the width of that clearance.

When the rotary shaft 1 runs eccentrically, the condenser or the like equipped with the rotary shaft 1 operates with a high noise level because of the sound produced by the impact between the inner peripheral surface of the concave receiving section 4 and the outer peripheral surface of the outer ring 5. Furthermore, this clearance produced between the rotating outer ring 5 and the inner peripheral surface of the cylindrical concave receiving section 4 in the compressor is the cause of lowered efficiency of the compressor or the like.

Technology intended to eliminate this type of drawback in conventional equipment has been disclosed in Japanese Patent Publications for Opposition Nos. Sho. 36-2255, Sho. 39-21584 and Sho. 40-13082, Japanese Utility Model Publications for Opposition Nos. Sho. 44-22006 and Sho. 57-53873, and Japanese Publications of Unexamined UM Application Nos. Sho. 56-131024, and Sho. 62-62023. The conventional technology outlined in these documents relates to an annular or circular ring-shaped sleeve comprising a plate spring, a synthetic resin, and an assembled body of a plate spring and rubber, or the like, installed between the housing and the outer ring of the rolling bearing.

However, in the case of a sleeve incorporating the commonly known technology outlined above, the rigidity with respect to the load in the direction of compression is inadequate, or the follow-up capability with respect to changes in the width of the clearance caused by thermal expansion is poor, therefore such a sleeve cannot necessarily provide a satisfactory performance.

SUMMARY OF THE INVENTION

An object of the present invention is to provide, with due consideration to the drawbacks of such conventional devices, a rolling-bearing/sleeve assembly wherein the rolling bearing reliably supports a rotary shaft even when a high degree of thermal expansion occurs.

This object is achieved in the present invention by the provision of a rolling-bearing/sleeve assembly, specifically a rolling bearing with a sleeve comprising a core fabricated from metal and a cylindrical spacer section fabricated from a synthetic resin laminated with the core, wherein the elasticity of the core and the large thermal expansion of the synthetic resin which forms the cylindrical spacer section are utilized to reliably support the rolling bearing and the rotary shaft.

BRIEF DESCRIPTION OF THE DRAWINGS

These and other objects, features, and advantages of the present invention will become more apparent from the following description of the preferred embodiments taken in conjunction with the accompanying drawings, in which:

FIG. 13 is a cross-sectional view showing one half of a bearing support sleeve for supporting a rolling bearing in a ninth embodiment in accordance with the present invention.

FIG. 14 is a cross sectional view of a rolling-bearing/sleeve assembly in which the sleeve of FIG. 13 is mounted.

FIG. 15 is a cross-sectional view illustrating part of a rotary shaft support device comprising the rolling-bearing/sleeve assembly of FIG. 14.

FIG. 16 is a partial cross-sectional view corresponding to FIG. 15 to show a deformed state of the sleeve of FIG. 13 when the temperature is elevated.

FIG. 17 shows a folded leaf formed on the edge section of a core in the sleeve, viewed in the direction of the arrow XVII in FIG. 13.

DETAILED DESCRIPTION OF THE PREFERRED EMBODIMENTS

Figure 1:
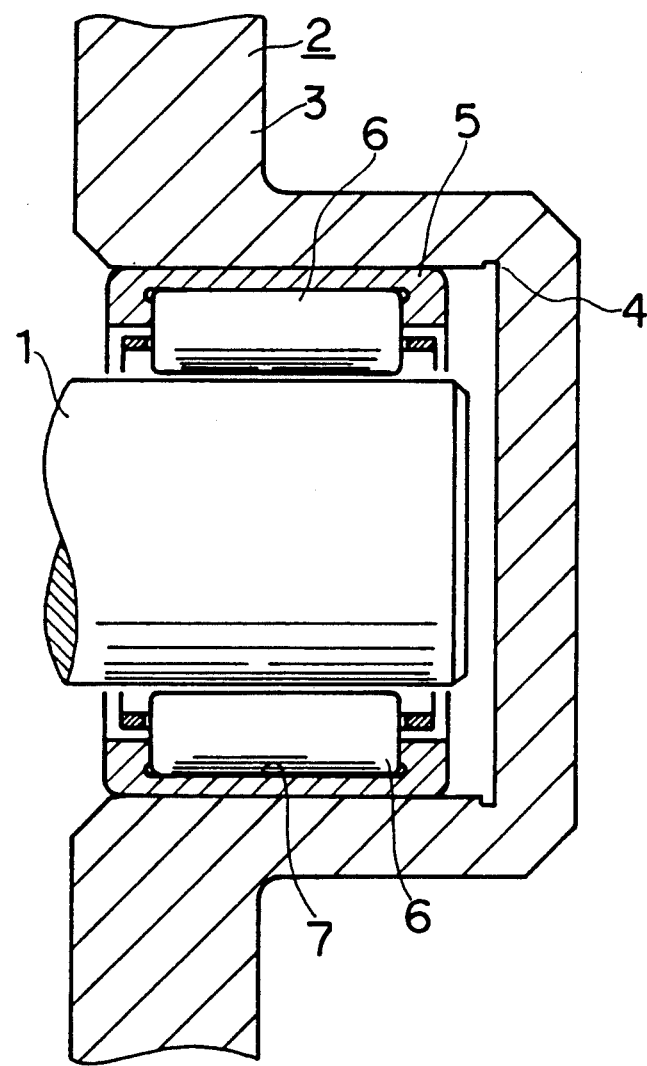
FIG. 1 is a cross sectional view showing one example of a rotary shaft support section in a compressor incorporating a rolling-bearing/sleeve assembly of the present invention.
Figure 2:
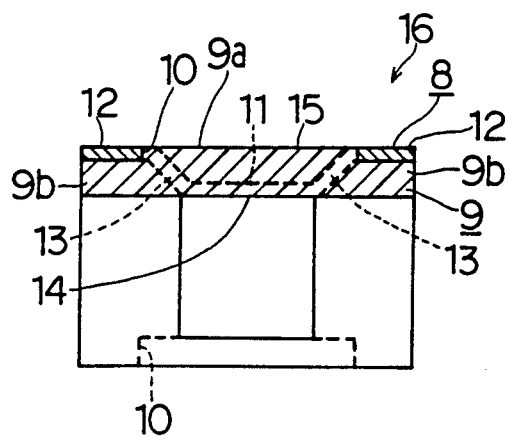
FIG. 2 is a cross-sectional view showing one half of a bearing support sleeve for supporting a rolling bearing in a first embodiment in accordance with the present invention.

Now referring to FIG. 2 to FIG. 5, which are illustrative of part of a first embodiment of the rolling-bearing/sleeve assembly in the present invention, a bearing support sleeve 16 is positioned in a space between an outer peripheral surface of a steel outer ring 18 of a rolling bearing 17 and an inner peripheral surface of a concave receiving section 4 formed in an aluminum alloy housing 2 and used to support the rolling bearing 17. The sleeve 16 comprises a core 8 made from a metal spring plate and a cylindrical spacer section 9 fabricated from a synthetic resin, in which the core 8 is formed as an insert in the spacer section 9.

The core 8 extends across the width of the spacer section 9 (the left-right direction in FIG. 2 to FIG. 4) and has an indented shape in cross section. In addition, the core 8 is fabricated in a short cylindrical shape and provided with a plurality of through-holes or slot 10, 10 which are juxtaposed in the circumferential direction. And, the core 8 has a high degree of dimensional elasticity so as to increase its thickness in the radial direction in the free state.

Specifically, the core 8 is fabricated from spring steel plate or the like, and the core 8 is formed as a basket-shaped support unit. In other words, the core 8 comprises an inner peripheral flat section 11 positioned at a mid portion in the width direction of the sleeve 16 and extending along the inner periphery of the sleeve 16, a pair of outer peripheral flat sections 12, 12, positioned at either end of the sleeve 16 in the width direction and extending along the outer periphery of the sleeve 16 and a pair of slanted sections 13, 13 to connect the inner peripheral flat section 11 with the outer peripheral flat sections 12, 12 to form a continuous body. The through-holes or slots 10, 10 are formed in a rectangular opening and extend over the inner peripheral flat section 11 and the slanted sections 13, 13, running parallel and equally spaced.

The cylindrical spacer section 9 of synthetic resin is laminated to both the inner and outer peripheral surfaces of the core 8 fabricated from metal spring plate, so that the core 8 is inserted or embedded into the spacer section 9. Then, an outer peripheral section 9a and a pair of inner peripheral sections 9b, 9b of the cylindrical spacer section 9 are integrally linked through the through-holes 10, 10.

The coefficient of expansion $\alpha_9$ of the synthetic resin forming the cylindrical spacer section 9 is larger than the coefficient of expansion $\alpha_2$ of the aluminum alloy forming the housing 2 (FIG. 3); which in turn is larger than the coefficient of expansion $\alpha_8$ of the metal spring plate from which the core 8 is formed; which in turn is larger than the coefficient of expansion $\alpha_{18}$ of the bearing steel which forms an outer ring 18 of the roller bearing. Specifically, this relationship is: $\alpha_9 > \alpha_2 > \alpha_8 > \alpha_{18}$.

When the spacer 9 is formed from synthetic resin with the core 8 used as an insert, the thickness of the core 8 (the dimension in the vertical direction in FIG. 2 to FIG. 5) is slightly contracted in a resilient manner with the inner and outer peripheral flat sections 11, 12 of the core 8 remained parallel to one another.

As a result, at normal temperatures the inner peripheral flat section 11 of the core 8 and the inner peripheral surfaces of the inner peripheral sections 9b, 9b of the cylindrical spacer section 9 are flush with each other to conjointly form a single inner peripheral surface 14. In addition, the outer peripheral surfaces of the outer peripheral flat sections 12, 12 of the core 8 and the outer peripheral surface of the outer peripheral section 9a of the cylindrical spacer section 9 are flush with each other to conjointly form a single outer peripheral surface 15.

Figure 3:
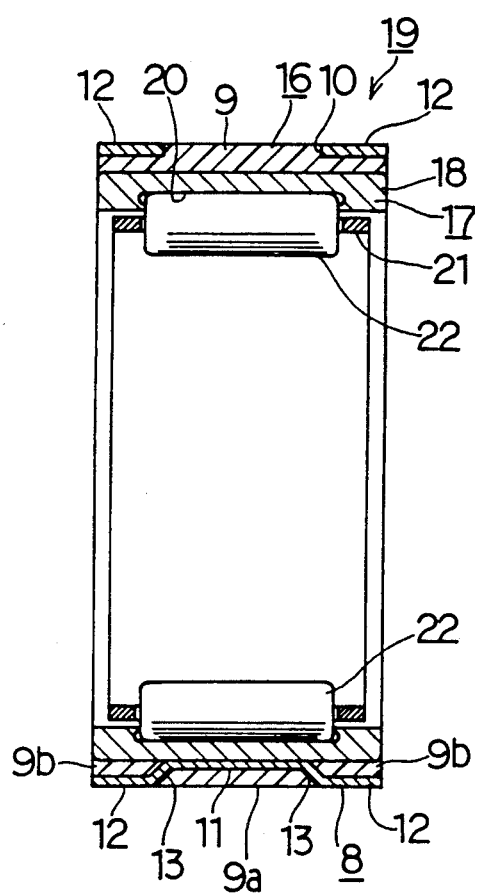
FIG. 3 is a cross sectional view of a rolling-bearing/sleeve assembly on which the sleeve of FIG. 2 is mounted.

The sleeve 16 which is used with the rolling bearing, specifically a roller bearing 17 is fitted securely over the outer ring 18 which is a part of the roller bearing 17, as shown in FIG. 3, to make up a rolling-bearing/sleeve assembly 19. An inner raceway 20 is formed at the inner peripheral surface of the outer ring 18. A plurality of roller bodies 22, 22 is provided, each of which is positioned on the inside of the outer ring 18 maintained by a support device 21. The roller bodies 22, 22 enable the operation of the roller bearing 17 by rolling on the inside of the inner raceway 20.

Figure 4:
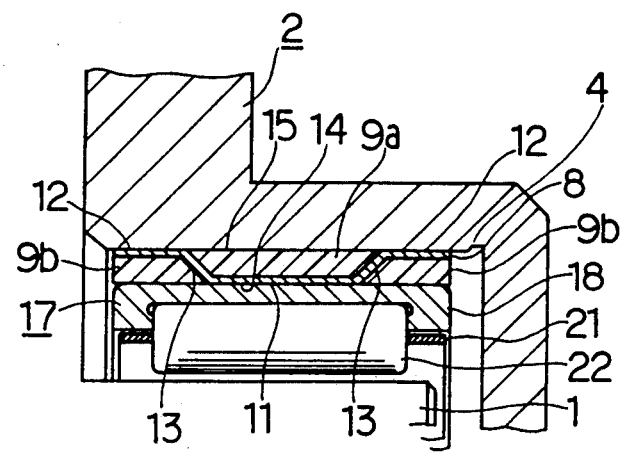
FIG. 4 is a cross-sectional view illustrating part of a rotary shaft support device comprising the rolling-bearing/sleeve assembly of FIG. 3.

The rolling-bearing/sleeve assembly 19 is incorporated into the housing 2, as shown in FIG. 4, and forms the support device for the rotary shaft 1. The housing 2 is fabricated from a material which has a coefficient of thermal expansion greater than that of an aluminum alloy or the like, and of steel. The concave receiving section 4 in a cylindrical shape with a bottom is formed in the housing 2. The rolling-bearing/sleeve assembly 19 is fitted securely into the space between the concave receiving section 4 and the outer ring 18, and the end section of the rotary shaft 1 is inserted into the bearing space surrounded by the roller bodies 22 to form the roller bearing 17. The bearing support sleeve 16 in the assembly of the support device of the rotary shaft 1 is subjected to a high pressure between the outer peripheral surface of the outer ring 18 which forms the roller bearing 17 and the inner peripheral surface of the concave receiving section 4 of the housing 2, so that the bearing support sleeve 16 is biased in the direction of the thickness (the vertical direction in the drawing).

In the present invention, the bearing support sleeve 16, the rolling-bearing/sleeve assembly 19 having the bearing support sleeve 16 incorporated therein, and the rotary shaft support device having the rolling-bearing/sleeve assembly 19 incorporated therein are fabricated as outlined above. In all these embodiments, the bearing support sleeve 16 is made up of the core 8 fabricated from an elastic metal spring plate and the cylindrical spacer section 9 fabricated from a synthetic resin with a large thermal coefficient of expansion. For this reason, even when, as the temperature rises, the space becomes larger between the outer peripheral surface of the steel outer ring 18 and the inner peripheral surface of the concave receiving section 4 formed in the aluminum alloy housing 2, the sleeve 16 becomes thicker to fill up the space, so the rotary shaft 1 supported inside the outer ring 18 is therefore prevented from running roughly due to looseness.

Figure 5:
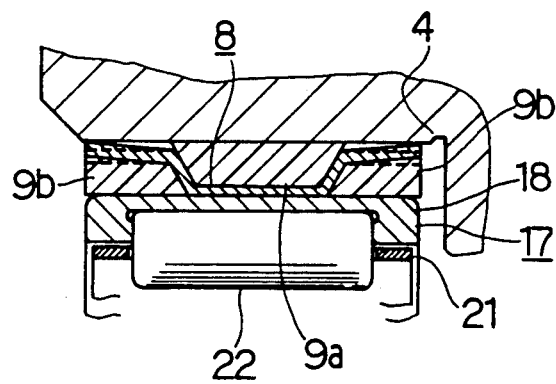
FIG. 5 is a cross-sectional view corresponding to FIG. 4 to show a deformed state of the sleeve of FIG. 2 when the temperature is elevated.

Specifically, the cylindrical spacer section 9 which forms the bearing support sleeve 16 is fabricated from a synthetic resin with a larger coefficient of thermal expansion than that of the aluminum alloy from which the housing 2 is constructed. Therefore, when the temperature of the rotary shaft support device rises, no clearance is produced between the outer peripheral surface of the bearing support sleeve 16 and the inner peripheral surface of the concave receiving section 4. When the temperature of the bearing support sleeve 16 rises, both the cylindrical spacer section 9 fabricated from the synthetic resin and the core 8 fabricated from the metal spring plate is deformed in shape because of the thermal expansion of the sleeve 9 as shown in FIG. 5 in an exaggerated manner. As a result, the cylindrical spacer section 9 and the core 8 conjointly push the outer peripheral surface of the steel outer ring 18 and the inner peripheral surface of the concave receiving section 4 so as to separate the outer and inner peripheral surfaces. For this reason, the outer ring 18 is reliably supported.

In addition, when the temperature rise in the support section is small so that the amount of thermal expansion of the cylindrical spacer section 9 of synthetic resin is also small, the outer ring 18 is firmly supported inside the concave receiving section 4 due to the elasticity in the core 8.

The load applied at right angles to the rotary shaft 1 is borne by both the cylindrical spacer section 9 of synthetic resin and the core 8 of metal spring plate. Therefore, the sleeve 16 is capable of adequately bearing a heavy loading. Accordingly, there is no looseness in the rotary shaft 1 nor any loss of rigidity in the bearing support sleeve 16, which might otherwise be caused by the load applied at right angles to the rotary shaft 1.

As a result, not only is it possible to reduce the operating noise level in the equipment such as a compressor or the like having the aluminum housing 2, but a drop in performance from a rise in temperature of such a unit can also be prevented.

The cross sectional shape of the metal spring plate core 8 in the bearing support sleeve 16 of the present invention is not limited to the configuration illustrated in FIG. 2 to FIG. 5, and cross sectional shapes such as those shown in FIG. 6 to FIG. 12 can also be adopted.

Figure 6:
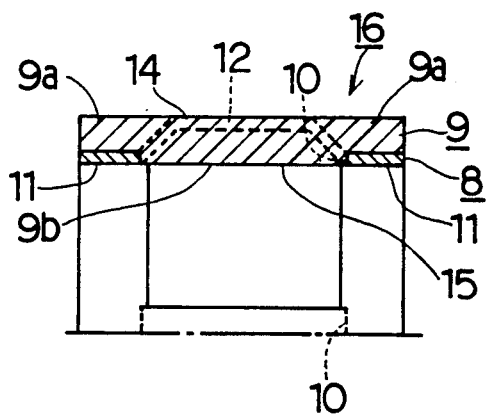

Among these, first, in the cross sectional shape of a second embodiment of the present invention shown in FIG. 6, the inner and outer peripheries of the cross sectional shape of the first embodiment shown in FIG. 2 to FIG. 5 are switched.

Figure 7:
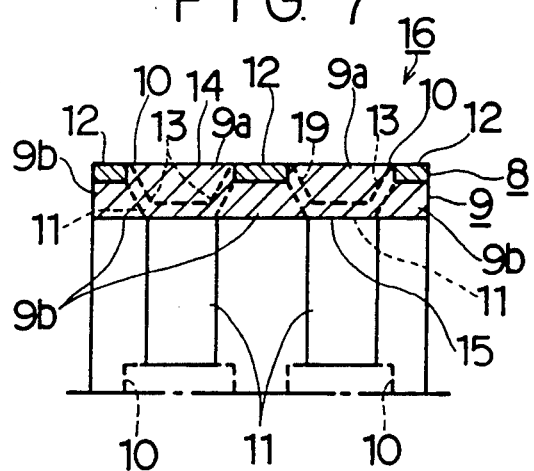
FIG. 6 to FIG. 12 illustrate second to eighth embodiments of the rolling-bearing/sleeve assembly of the present invention in sectional views corresponding to FIG. 2, respectively.

Also, for the cross sectional shape of a third embodiment of the present invention shown in FIG. 7, the inner peripheral flat sections 11, 11 are provided in two positions; the outer peripheral flat sections 12, 12 in three positions; and the slanted sections 13, 13 which link the flat sections 11 and 12, in four positions.

Figure 8:
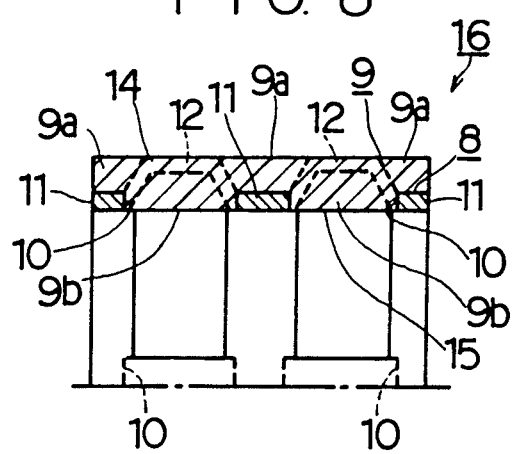

In a fourth embodiment illustrated in FIG. 8, the inner and outer peripheries of the cross sectional shape of the third embodiment are switched.

Figure 9:
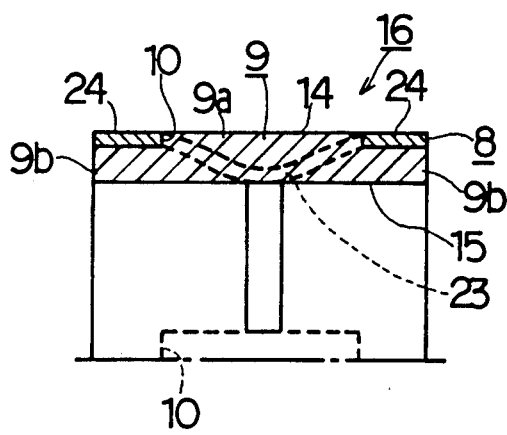

In addition, for the cross sectional shape of a fifth embodiment shown in FIG. 9, a circular arc-shaped section 23 is formed at a center portion and a flat sections 24 is formed on either side of the circular arc-shaped section 23, which is partly exposed at the inner peripheral surface of the sleeve 16.

Figure 10:
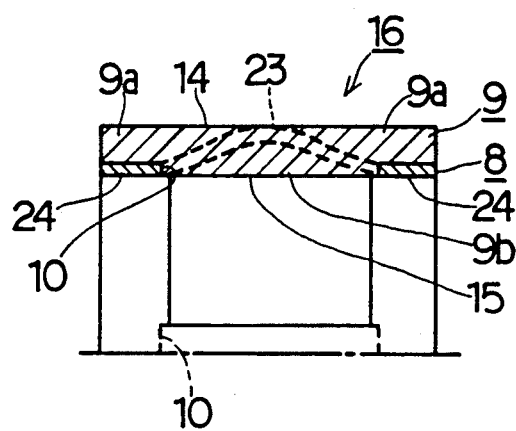

In a sixth embodiment illustrated in FIG. 10, the inner and outer peripheries of the cross sectional shape of the fifth embodiment are switched.

Figure 11:
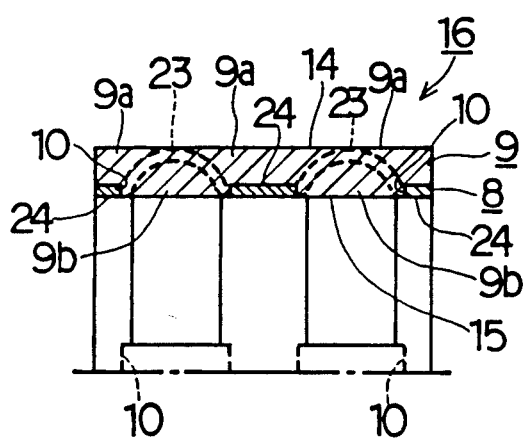

In the case of a seventh embodiment shown in FIG. 11, the circular arc-shaped sections 23, 23 are formed in two positions, and the flat sections 24, 24 in three positions.

Figure 12:
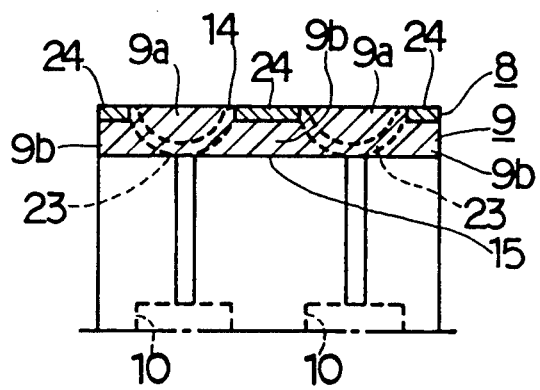

In an eighth embodiment illustrated in FIG. 12, the inner and outer peripheries of the cross sectional shape of the seventh embodiment are switched.

It should be noted that, for all these embodiments, the core 8 is exposed at both the inner and outer peripheral surfaces of the bearing support sleeve sleeve 16, so that in the case where the bearing support sleeve 16 is pressed in the space between the outer peripheral surface of the outer ring 18 and the inner peripheral surface of the concave receiving section 4, not only the cylindrical spacer section 9 of synthetic resin but also the core 8 of metal spring plate is in contact with both the inner and outer peripheral surfaces.

In order that the rolling-bearing/sleeve assembly 19 or the rotary shaft support device incorporating the rolling-bearing/sleeve assembly 19 therein is formed, it is possible to fabricate the parts separately, then engage them, or, it is possible to integrally combine the outer ring 18 of the roller bearing 17 and the sleeve 16 (and also the concave receiving section 4) when forming the cylindrical spacer section 9 by injection molding.

Next, a ninth embodiment of the present invention will be explained with reference to FIG. 13 to FIG. 17.

A first tongue leaf and a second tongue leaf are formed at one end of a core 8a, so that they project from the edge section of the core 8a. The first tongue leaf is folded to face inward at right angles to become a first folded leaf 25; the second tongue leaf is folded to face outward at right angles to become a second folded leaf 26. As shown in FIG. 17, the folded leaves 25, 26 project from the inner peripheral surface of a bearing support sleeve 16a, or project from the outer peripheral surface of the sleeve 16a, respectively.

The spacer section 9 of synthetic resin is laminated to both the inner peripheral surface and the outer peripheral surface of the core 8a. The outer peripheral section 9a and the inner peripheral sections 9b, 9b of the spacer section 9 are integrally linked through the through-holes 10, 10 to form the bearing support sleeve 16a.

As shown in FIG. 14, the bearing support sleeve 16a is securely fitted over an outer ring 18a which forms a roller bearing 17a to provide a rolling-bearing/sleeve assembly 19a. A first concave engaging section 27 is formed on the outer peripheral surface of the end section of the outer ring 18a which forms the roller bearing 17a. Then, when the bearing support sleeve 16a is securely fitted over the outer ring 18a, the first concave engaging section 27 and the first folded leaf 25 are engaged with each other. This prevents any relative rotation between the bearing support sleeve 16a and the outer ring 18a (sliding movement of the inner peripheral surface of the bearing support sleeve 16a on the outer peripheral surface of the outer ring 18a).

In addition, a second concave engaging section 28 is formed at the open end section of the inner peripheral surface of the concave receiving section 4a formed in the housing 2, to secure the rolling-bearing/sleeve assembly 19a fitted in the concave receiving section 4a. Then, when the bearing support sleeve 16a is securely fitted into the concave receiving section 4a, the second concave engaging section 28 and the second folded leaf 26 are engaged with each other. This prevents any relative rotation of the bearing support sleeve 16a inside the concave receiving section 4a (sliding movement of the outer peripheral surface of the sleeve 16a on the inner peripheral surface of the concave receiving section 4a).

In this embodiment of the present invention, the following effects are obtained in addition to the effects of the first embodiment of the present invention.

Even though there is almost no interference when the bearing support sleeve 16a is pressed into the space between the outer peripheral surface of the outer ring 18a and the inner peripheral surface of the concave receiving section 4a (even when only a light pressure is required to press the sleeve 16a into the space), it is possible to reliably prevent the outer ring 18a from rotating within the concave receiving section 4a.

Figure 18:
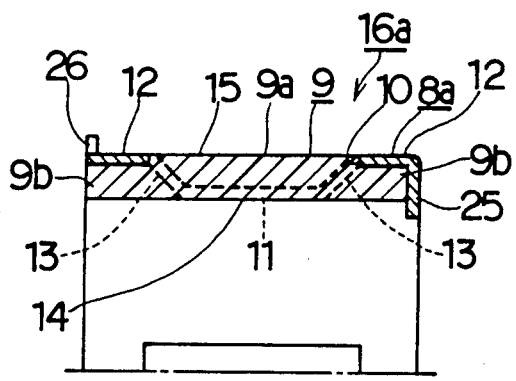
FIG. 18 is a cross-sectional view showing one half of a bearing support sleeve for supporting a rolling bearing in a tenth embodiment of the present invention.
Figure 19:
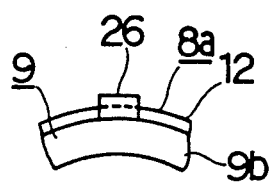
FIG. 19 is a drawing viewed from the left of FIG. 18 with a portion cut away.
Figure 20:
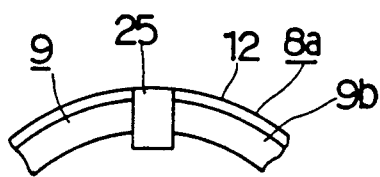
FIG. 20 is a drawing viewed from the right of FIG. 18 with a portion cut away.

Furthermore, it is not absolutely necessary that the first and second folded leaves 25, 26 be formed at the edge of the same end section of the core 8a. As shown in the tenth embodiment illustrated in FIG. 18 to FIG. 20, the first folded leaf 25 and the second folded leaf 26 can be formed at opposite ends of the core 8a.

Figure 21:
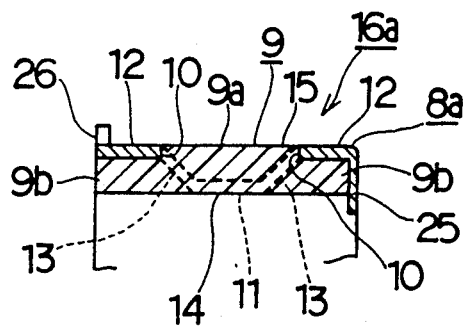
FIG. 21 to FIG. 23 illustrate an eleventh embodiment of the present invention, corresponding to FIG. 18 to FIG. 20, respectively.
Figure 22:
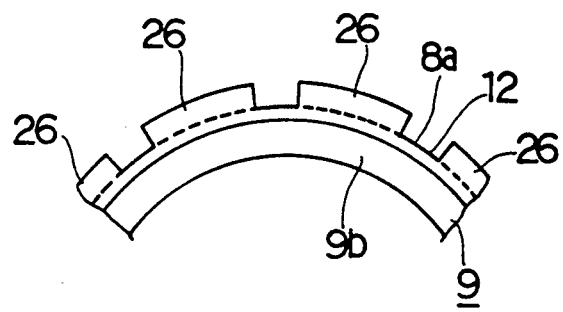
Figure 23:
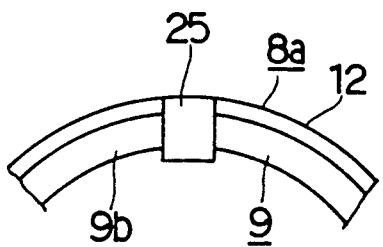
Figure 27:
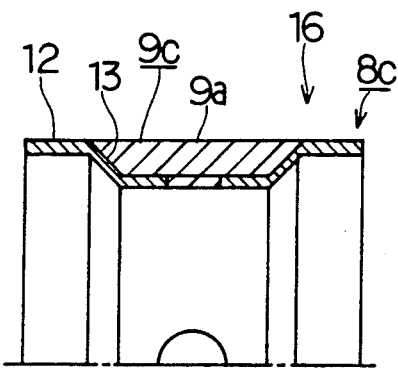
FIG. 27 to FIG. 30 illustrate a thirteenth embodiment of the present invention, corresponding to FIG. 2 to FIG. 5, respectively.
Figure 28:
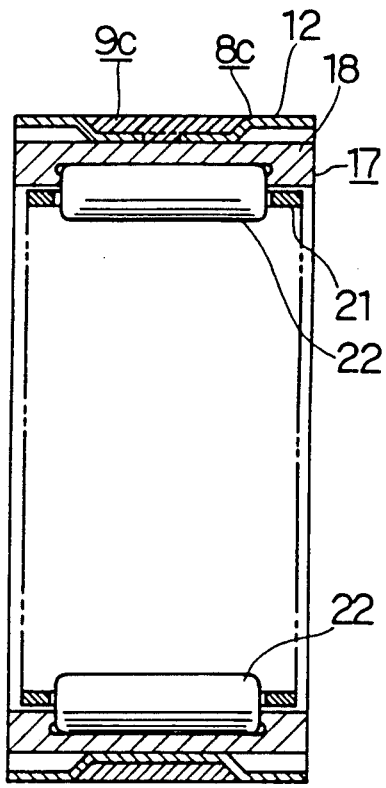
Figure 29:
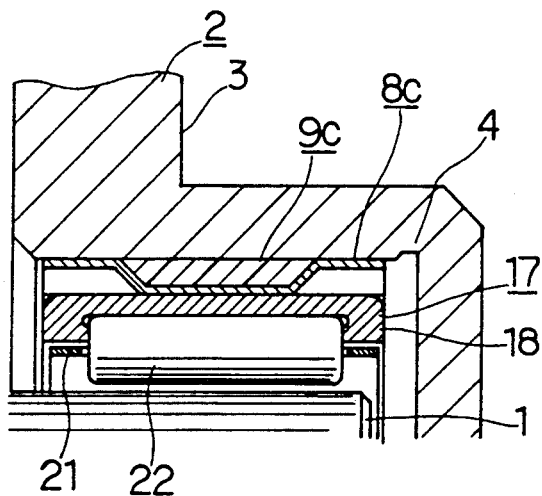
Figure 30:
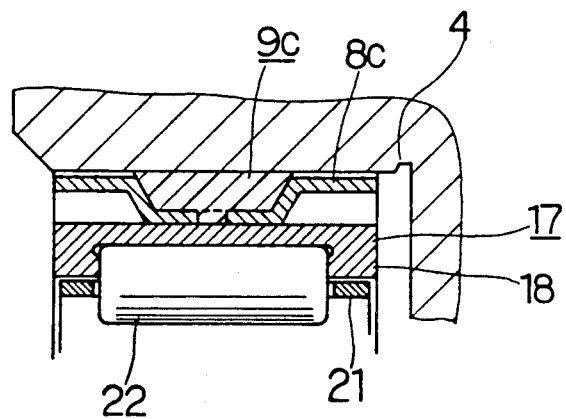

Also, the shape and number of the first and second folded leaves 25, 26 are not limited to those in the ninth and tenth embodiments in which both of the folded leaves 25, 26 of the thin type is used in one edge. For example, a wide-type of the second folded leaves 26, 26 can be evenly spaced at several positions, as in the eleventh embodiment shown in FIG. 21 to FIG. 23.

The cross sectional shape of the core 8a is not limited to the shapes previously outlined. Other cross sections can also be adopted, such as those shown for the second to seventh embodiments.

Figure 24:
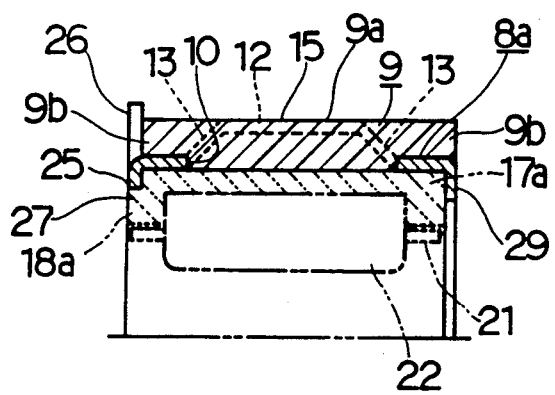
FIG. 24 to FIG. 26 illustrate a twelfth embodiment of the present invention, corresponding to FIG. 18 to FIG. 20, respectively.
Figure 26:
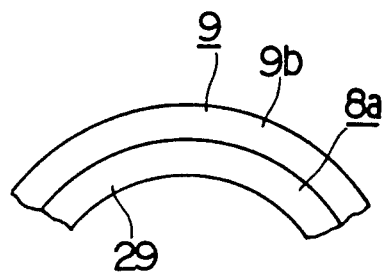
Figure 25:
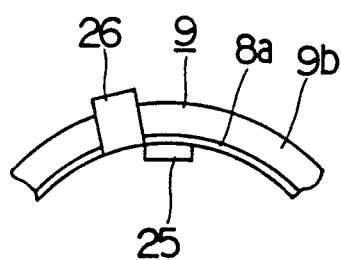

For example, as in the twelfth embodiment illustrated in FIG. 24 to FIG. 26, the edge of the core 8a can be formed by being bent in the inward direction extending generally over the entire periphery to provide an inward flange section 29, and by means of this inward flange section 29, it is possible to position the sleeve 16a relative to the outer ring 18a in the width (left-right direction in FIG. 24). In this embodiment, the first folded leaf 25 provided at the edge of the core 8a (the left edge in FIG. 24) is formed by folding after the core 8a is set in the outer ring 18a of the roller bearing 17a.

Next, FIG. 27 to FIG. 30 show a thirteenth embodiment of the present invention. In this embodiment, constructions and functions are substantially the same as in the first embodiment except that a synthetic resin spacer 9c is provided only on the outer peripheral side of a core 8c.

Figure 31:
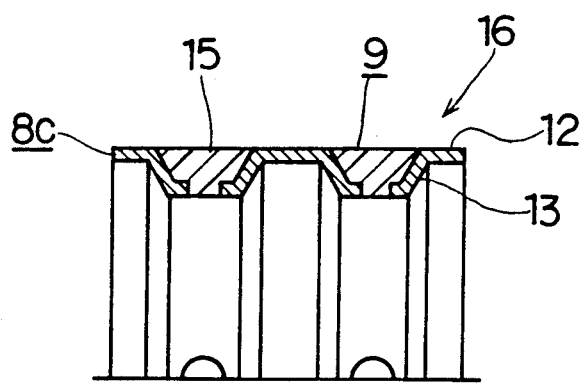
FIG. 31 to FIG. 33 illustrate one half of the rolling-bearing/sleeve assembly in fourteenth to sixteenth embodiments of the present invention in cross sectional views corresponding to FIG. 27, respectively.
Figure 32:
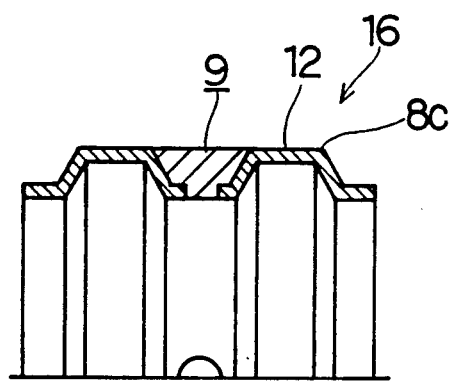
Figure 33:
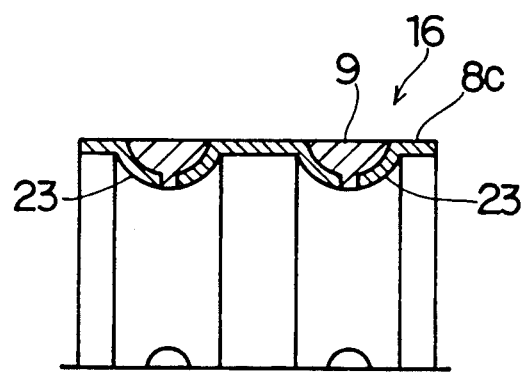

The cross sectional shape of the core 8c of metal spring plate is not limited to the shapes shown in FIG. 27 to FIG. 30. It is also possible to adopt other cross sectional shapes such as those shown for the fourteenth to sixteenth embodiments shown in FIG. 31 to FIG. 33.

What is claimed is:

1. A rolling-bearing/sleeve assembly, comprising:
   a rolling bearing which has an outer ring and a plurality of rolling bodies, such that said outer ring has inner and outer peripheral surfaces and an inner raceway on said inner peripheral surface thereof and said plurality of rolling bodies are rotatably provided on said inner raceway; and
   a bearing support sleeve including:
   a metal core having outer and inner peripheral surfaces and a high degree of dimensional elasticity to have a larger radial thickness in a free state and fabricated in a short cylindrical shape with a width which is indented across said width in cross section, and
   a cylindrical spacer section of synthetic resin having an outer peripheral surface laminated with said core on said outer peripheral surface thereof, such that, at normal temperature, one part of said outer peripheral surface of said core and one part of said outer peripheral surface of said cylindrical spacer section are flush with each other to conjointly form a single outer peripheral surface;
   wherein said bearing support sleeve is secured to said outer peripheral surface of said outer ring of said rolling bearing, and
   wherein said outer ring forming said rolling bearing is formed on said outer peripheral surface thereof with a concave engaging section,
   said core has an edge section and a first tongue leaf projected from said edge section to be inwardly folded to form a first folded leaf which is freely engaged with said concave engaging section, and
   said core has a second tongue leaf projected from said edge section to be outwardly folded to form a second folded leaf for engagement in a housing means for supporting the rolling bearing/sleeve assembly.

2. A bearing support sleeve for supporting a rolling bearing having an outer ring and a plurality of rolling bodies, the bearing support sleeve comprising:
   a metal core having a high degree of dimensional elasticity to have a larger radial thickness in a free state and fabricated in a short cylindrical shape with a width which is indented across said width in cross section, said metal core having outer and inner peripheral surfaces; and a cylindrical spacer section of synthetic resin laminated with said core on said outer peripheral surface thereof and having an outer peripheral surface, such that, at normal temperature, one part of said outer peripheral surface of said core and one part of said outer peripheral surface of said cylindrical spacer section are flush with each other to conjointly form a single outer peripheral surface, wherein said core has an edge section and a first tongue leaf projected from said edge section to be inwardly folded to form a first folded leaf for engaging in the outer ring of the rolling bearing, and said core has a second tongue leaf projected from said edge section to be outwardly folded to form a second folded leaf for engagement in a housing means for supporting the bearing support sleeve.

3. A support device for a rotary shaft with a rolling-bearing/sleeve assembly, installed therein, comprising:

a cylindrical housing fabricated from a material with a coefficient of thermal expansion greater than that of steel and having an inner peripheral surface;

a rolling bearing which has an outer ring and a plurality of rolling bodies, such that said outer ring has inner and outer peripheral surfaces and an inner raceway on said inner peripheral surface thereof and said plurality of rolling bodies are rotatably provided on said inner raceway, wherein said cylindrical housing and said rolling bearing are arranged to produce a space between said outer peripheral surface of said outer ring and said inner peripheral surface of said housing;

a bearing support sleeve including:

a metal core having outer and inner peripheral surfaces and a high degree of dimensional elasticity to have a larger radial thickness in a free state and fabricated in a short cylindrical shape with a width which is indented across said width in cross section; and a cylindrical spacer section of synthetic resin laminated with said core on said outer peripheral surface thereof and having an outer peripheral surface, such that, at normal temperature, one part of said outer peripheral surface of said core and one part of said outer peripheral surface of said cylindrical spacer section are flush with each other to conjointly form a single outer peripheral surface, wherein said bearing support sleeve is securely inserted into said space between said outer peripheral surface of said outer ring and said inner peripheral surface of said housing, wherein said outer ring forming said rolling bearing is formed on said outer peripheral surface thereof with a first concave engaging section, said core has an edge section and a first tongue leaf projected from said edge section to be inwardly folded to form a first folded leaf which is freely engaged with said first concave engaging section, said housing is formed on said inner peripheral surface thereof with a second concave engaging section, and said core has a second tongue leaf projected from said edge section to be outwardly folded to form a second folded leaf which is freely engaged with said second concave engaging section.

4. A support device for a rotary shaft with a rolling bearing/sleeve assembly installed therein, comprising:

a cylindrical housing fabricated from a material with a coefficient of thermal expansion greater than that of steel and having an inner peripheral surface;

a rolling bearing which has an outer ring and a plurality of rolling bodies, such that said outer ring has inner and outer peripheral surfaces and an inner raceway on said inner peripheral surface thereof and said plurality of rolling bodies are rotatably provided on said inner raceway, wherein said cylindrical housing and said rolling bearing are arranged to produce a space between said outer peripheral surface of said outer ring and said inner peripheral surface of said housing;

a bearing support sleeve including:

a metal core having outer and inner peripheral surfaces and a high degree of dimensional elasticity to have a larger radial thickness in a free state and fabricated in a short cylindrical shape with a width which is indented across said width in cross section; and a first cylindrical spacer section of synthetic resin laminated with said core on said outer peripheral surface thereof and having an outer peripheral surface, such that, at normal temperature, one part of said outer peripheral surface of said core and one part of said outer peripheral surface of said cylindrical spacer section are flush with each other to conjointly form a single outer peripheral surface, wherein said bearing support sleeve is securely inserted into said space between said outer peripheral surface of said outer ring and said inner peripheral surface of said housing, wherein said bearing support sleeve has a second cylindrical spacer section of synthetic resin laminated with said core on said inner peripheral surface thereof and having an inner peripheral surface, such that, at normal temperature, one part of said inner peripheral surface of said core and one part of said inner peripheral surface of said cylindrical spacer section are flush with each other to conjointly form a single inner peripheral surface, wherein said bearing support sleeve is securely inserted into said space between said outer peripheral surface of said outer ring and said inner peripheral surface of said housing, and wherein said outer ring forming said rolling bearing is formed on said outer peripheral surface thereof with a first concave engaging section, said core has an edge section and a first tongue leaf projected from said edge section to be inwardly folded to form a first folded leaf which is freely engaged with said first concave engaging section, said housing is formed on said inner peripheral surface thereof with a second concave engaging section, and said core has a second tongue leaf projected from said edge section to be outwardly folded to form a second folded leaf which is freely engaged with said second concave engaging section.

* * * * *